US012580922B2

(12) United States Patent
Mengusoglu et al.

(10) Patent No.: US 12,580,922 B2
(45) Date of Patent: Mar. 17, 2026

(54) USER ACCESS GROUP DISCOVERY

(71) Applicant: International Business Machines Corporation, Armonk, NY (US)

(72) Inventors: Erhan Mengusoglu, Southampton (GB); John Donald Taylor, Eastleigh (GB); Colin R. Penfold, Ropley (GB); Gregory Lubel, Woolston (GB); Mark John Pocock, Southampton (GB); David Michael Key, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 90 days.

(21) Appl. No.: 18/436,471

(22) Filed: Feb. 8, 2024

(65) Prior Publication Data

US 2025/0227113 A1 Jul. 10, 2025

(30) Foreign Application Priority Data

Jan. 10, 2024 (GB) ..................................... 2400330

(51) Int. Cl.
H04L 29/06 (2006.01)
H04L 9/40 (2022.01)

(52) U.S. Cl.
CPC .......... H04L 63/104 (2013.01); H04L 63/105 (2013.01); H04L 63/20 (2013.01)

(58) Field of Classification Search
CPC ...... H04L 63/104; H04L 63/105; H04L 63/20
See application file for complete search history.

(56) References Cited

U.S. PATENT DOCUMENTS 6,356,858 B1 3/2002 Malka
7,603,660 B2 10/2009 Davia
(Continued)

FOREIGN PATENT DOCUMENTS

CN 111654549 B 11/2022
CN 111756697 B 5/2023
(Continued)

OTHER PUBLICATIONS

"OWASP Web Security Testing Guide", OWASP Foundation, 5 pps., printed from the Internet on Jan. 11, 2024, <https://owasp.org/www-project-web-security-testing-guide/>.
(Continued)

*Primary Examiner* — Evans Desrosiers
(74) *Attorney, Agent, or Firm* — Aaron N. Pontikos

(57) ABSTRACT

A method, computer program product, and computer system are provided for user access group discovery. The method includes: generating a matrix that depicts the respective resources of a set of resources accessed by each of a plurality of users; obtaining, for each user, a similarity measurement using the matrix, wherein the similarity measurement is based on a comparison of the resources accessed by the user to the resources accessed by the other users; generating, for each user, a feature vector for clustering the users into user access groups, wherein the feature vector represents the resources accessed by the user; applying the feature vectors and the similarity measurements to a centroid-based clustering algorithm to obtain the user access groups; and outputting the user access groups for application in a security environment.

24 Claims, 10 Drawing Sheets

100

(56)     References Cited

U.S. PATENT DOCUMENTS

| 7,818,788 | B2 | 10/2010 | Meier |
| 10,061,992 | B2 | 8/2018 | Gondo |
| 10,318,886 | B2 | 6/2019 | Baradaran |
| 10,601,871 | B2 | 3/2020 | Hosie |
| 10,681,056 | B1 | 6/2020 | Badawy |
| 11,424,914 | B2 | 8/2022 | Weiss |
| 11,663,324 | B2 | 5/2023 | Penfold |
| 11,775,416 | B2 | 10/2023 | Eizenman |
| 2002/0026592 | A1 | 2/2002 | Gavrila |
| 2006/0294503 | A1 | 12/2006 | Henderson |
| 2007/0199050 | A1 | 8/2007 | Meier |
| 2013/0067436 | A1 | 3/2013 | Bnayahu |
| 2013/0086470 | A1* | 4/2013 | Dorr ..................... G06F 16/35 |
| | | | 715/256 |
| 2015/0156190 | A1 | 6/2015 | Sanso |
| 2018/0205759 | A1 | 7/2018 | Hosie |
| 2019/0158513 | A1* | 5/2019 | Shtar ................... G06F 21/552 |
| 2019/0272386 | A1 | 9/2019 | Ley |
| 2020/0153855 | A1 | 5/2020 | Kirti |
| 2020/0175152 | A1 | 6/2020 | Xu |
| 2020/0252405 | A1 | 8/2020 | Sankavaram |
| 2021/0019142 | A1 | 1/2021 | Bhagwan |
| 2021/0092126 | A1 | 3/2021 | Mcalister |
| 2021/0185050 | A1 | 6/2021 | Rosmann |
| 2023/0179604 | A1 | 6/2023 | Adcock |

FOREIGN PATENT DOCUMENTS

| CN | 110908912 B | 11/2023 |
| GB | 2637148 A | 7/2025 |

OTHER PUBLICATIONS

"Your Partner in Role Testing", testlio, 7 pp., printed from the Internet on Jan. 11, 2024, <https://testlio.com/role-testing/>.

Cobb, "Best practices for audit, log review for IT security investigations", ComputerWeekly.com, Aug. 8, 2011, 5pps., <https://www.computerweekly.com/tip/Best-practices-for-audit-log-review-for-IT-security-investigations>.

Disclosed Anonymously ,"URI Based Entry Points", Part of Cisco, Feb. 25, 2021, 9 pps., <https://docs.appdynamics.com/display/PRO21/URI+Based+Entry+Points>.

Disclosed Anonymously, "Defining Security Requirements for Web Applications—The Java EE5 Tutorial", Feb. 25, 2021, 13pps., <https://docs.oracle.com/javaee/5/tutorial/doc/bncbe.html>.

Disclosed Anonymously, "OWASP Application Security Verification Standard", Feb. 25, 2021, 5pps., <https://owasp.org/www-project-application-security-verifi cation-standard/>.

GB Patent Application No. GB2400330.3 filed Jan. 10, 2024.

Karkera, "Test coverage using Cypress", Medium, Sep. 20, 2021, 27 pps., <https://medium.com/anarocktech/test-coverage-using-cypress-for-create-booking-feature-4a54d6d05ab9>.

List of IBM Patents or Patent Applications Treated as Related, 2 pages.

Saad, "Security Testing Guide", Version 4.2, 465 pps., printed from the Internet on Jan. 11, 2024, <https://github.com/OWASP/wstg/releases/download/v4.2/wstg-v4.2.pdf>.

* cited by examiner

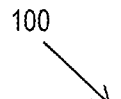
100

```
┌─────────────────────┐          ┌─────────────────────┐
│  SYSTEM ACCESS      │          │ DISCOVERED RUNTIME  │
│  DEFINITIONS        │          │   ACCESSES          │
│      101            │          │     102             │
└─────────────────────┘          └─────────────────────┘
         ┆                                  ┆
┌─────────────────────┐          ┌─────────────────────┐
│  <REPRESENTED AS>   │┄┄┄┄┄┄┄┄┄┄│  <REPRESENTED AS>   │
└─────────────────────┘          └─────────────────────┘
         ┆
┌─────────────────────┐
│ USER-RESOURCE ACCESS│
│   MATRIX 103        │
└─────────────────────┘
         │
         ▼
┌─────────────────────┐                    ┌──────────────┐          ┌─────────────────────┐
│                     │┄┄┄┄┄┄┄┄┄┄┄┄┄┄┄┄┄┄┄┄│  <USES>      │┄┄┄┄┄┄┄┄┄┄│  SIMILARITY         │
│ SIMILARITY ANALYSIS │                    └──────────────┘          │  MEASUREMENT 106    │
│      104            │                    ┌──────────────┐          └─────────────────────┘
│                     │┄┄┄┄┄┄┄┄┄┄┄┄┄┄┄┄┄┄┄┄│  <USES>      │┄┄┄┄┄┄┄┄┄┄┐
└─────────────────────┘                    └──────────────┘          ┌─────────────────────┐
         │                                 ┌──────────────┐          │  GROUP              │
         ▼                         ┌┄┄┄┄┄┄┄│  <USES>      │          │  INITIALIZATION 107 │
┌─────────────────────┐           │       └──────────────┘          └─────────────────────┘
│  PROVIDE GROUPS     │           │                                 ┌─────────────────────┐
│      105            │           └┄┄┄┄┄┄┄┄┄┄┄┄┄┄┄┄┄┄┄┄┄┄┄┄┄┄┄┄┄┄┄┄│  GROUP STOPPING     │
└─────────────────────┘                                             │  THRESHOLD 108      │
                                                                    └─────────────────────┘
```

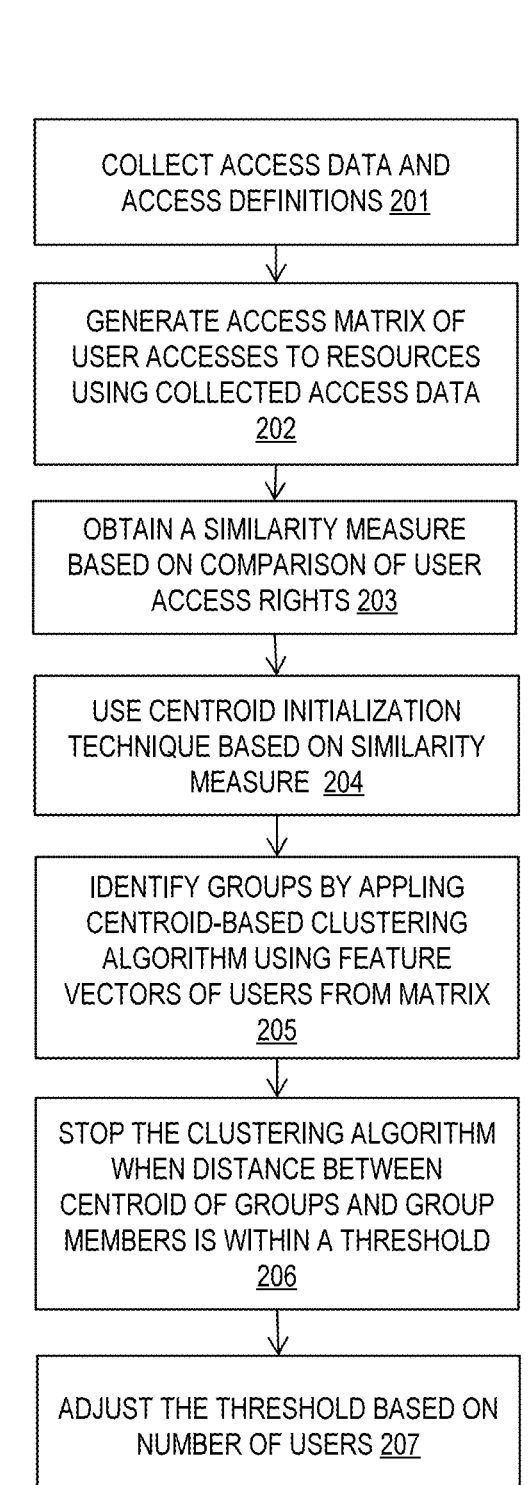

COLLECT ACCESS DATA AND ACCESS DEFINITIONS 201

GENERATE ACCESS MATRIX OF USER ACCESSES TO RESOURCES USING COLLECTED ACCESS DATA 202

OBTAIN A SIMILARITY MEASURE BASED ON COMPARISON OF USER ACCESS RIGHTS 203

USE CENTROID INITIALIZATION TECHNIQUE BASED ON SIMILARITY MEASURE 204

IDENTIFY GROUPS BY APPLING CENTROID-BASED CLUSTERING ALGORITHM USING FEATURE VECTORS OF USERS FROM MATRIX 205

STOP THE CLUSTERING ALGORITHM WHEN DISTANCE BETWEEN CENTROID OF GROUPS AND GROUP MEMBERS IS WITHIN A THRESHOLD 206

ADJUST THE THRESHOLD BASED ON NUMBER OF USERS 207

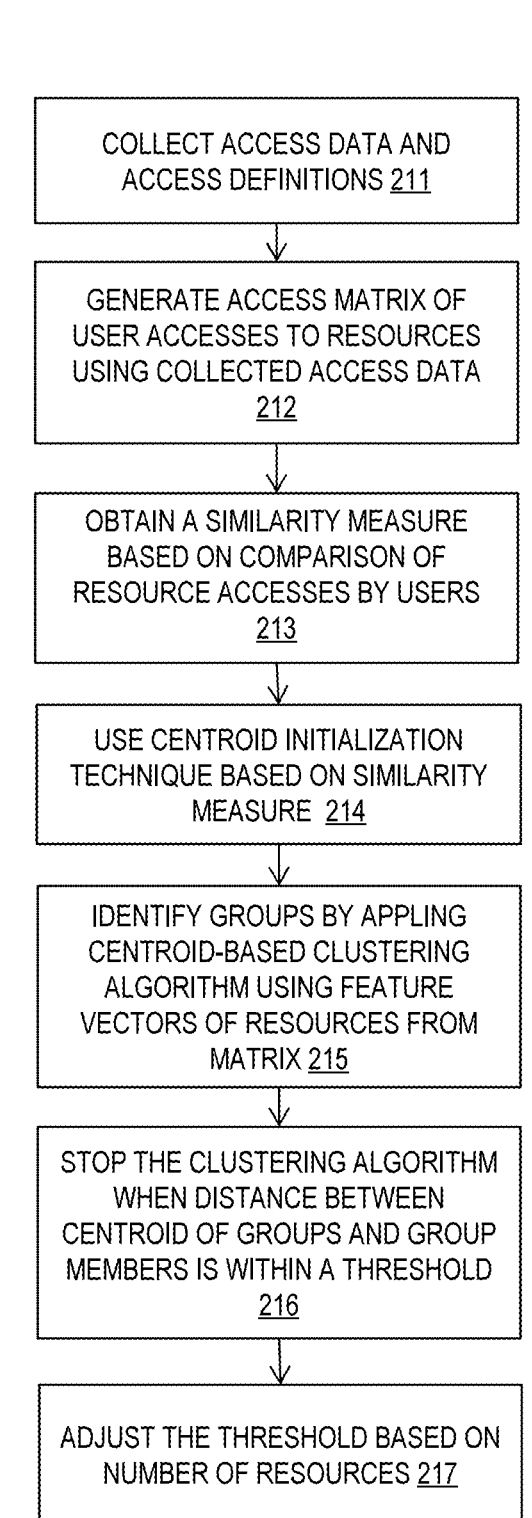

COLLECT ACCESS DATA AND ACCESS DEFINITIONS 211

GENERATE ACCESS MATRIX OF USER ACCESSES TO RESOURCES USING COLLECTED ACCESS DATA 212

OBTAIN A SIMILARITY MEASURE BASED ON COMPARISON OF RESOURCE ACCESSES BY USERS 213

USE CENTROID INITIALIZATION TECHNIQUE BASED ON SIMILARITY MEASURE 214

IDENTIFY GROUPS BY APPLING CENTROID-BASED CLUSTERING ALGORITHM USING FEATURE VECTORS OF RESOURCES FROM MATRIX 215

STOP THE CLUSTERING ALGORITHM WHEN DISTANCE BETWEEN CENTROID OF GROUPS AND GROUP MEMBERS IS WITHIN A THRESHOLD 216

ADJUST THE THRESHOLD BASED ON NUMBER OF RESOURCES 217

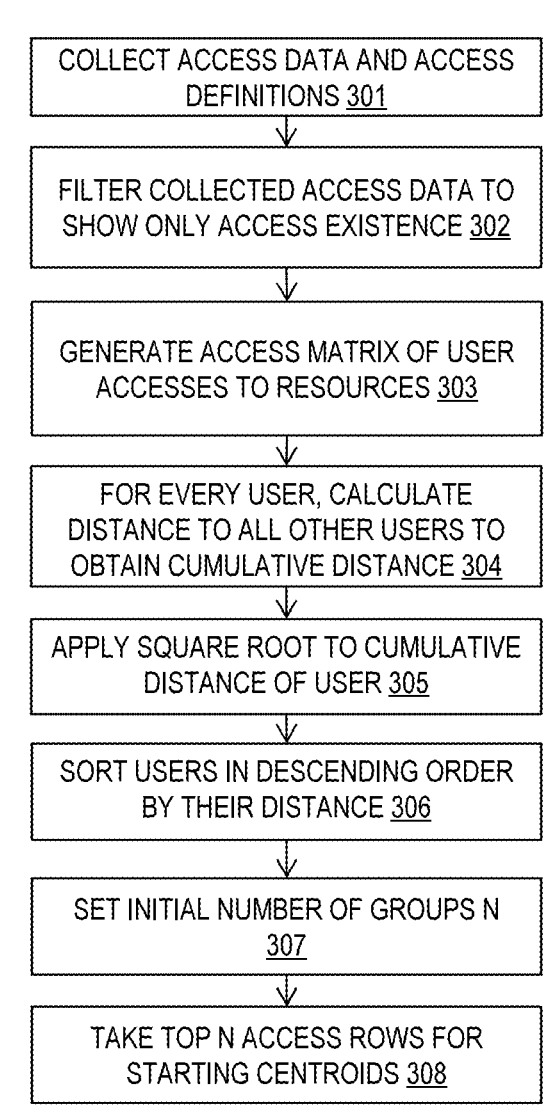

COLLECT ACCESS DATA AND ACCESS DEFINITIONS 301

FILTER COLLECTED ACCESS DATA TO SHOW ONLY ACCESS EXISTENCE 302

GENERATE ACCESS MATRIX OF USER ACCESSES TO RESOURCES 303

FOR EVERY USER, CALCULATE DISTANCE TO ALL OTHER USERS TO OBTAIN CUMULATIVE DISTANCE 304

APPLY SQUARE ROOT TO CUMULATIVE DISTANCE OF USER 305

SORT USERS IN DESCENDING ORDER BY THEIR DISTANCE 306

SET INITIAL NUMBER OF GROUPS N 307

TAKE TOP N ACCESS ROWS FOR STARTING CENTROIDS 308

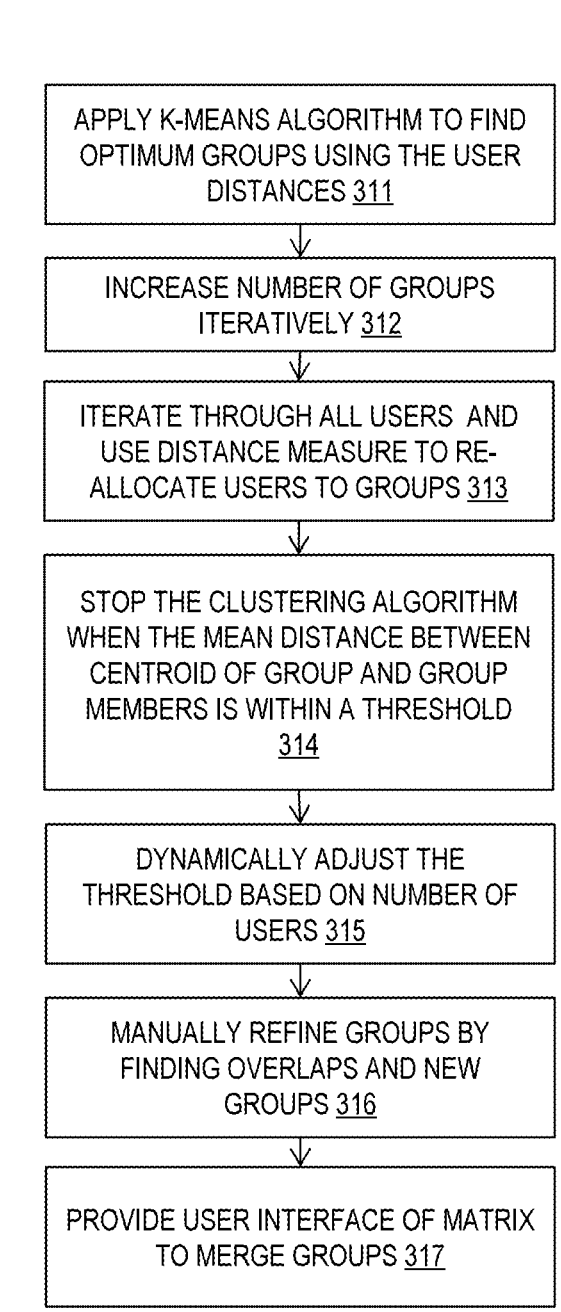

APPLY K-MEANS ALGORITHM TO FIND OPTIMUM GROUPS USING THE USER DISTANCES 311

INCREASE NUMBER OF GROUPS ITERATIVELY 312

ITERATE THROUGH ALL USERS AND USE DISTANCE MEASURE TO RE-ALLOCATE USERS TO GROUPS 313

STOP THE CLUSTERING ALGORITHM WHEN THE MEAN DISTANCE BETWEEN CENTROID OF GROUP AND GROUP MEMBERS IS WITHIN A THRESHOLD 314

DYNAMICALLY ADJUST THE THRESHOLD BASED ON NUMBER OF USERS 315

MANUALLY REFINE GROUPS BY FINDING OVERLAPS AND NEW GROUPS 316

PROVIDE USER INTERFACE OF MATRIX TO MERGE GROUPS 317

| √ | √ | √ | √ | √ | √ | √ | √ | √ | √ | √ | √ |
|---|---|---|---|---|---|---|---|---|---|---|---|
| √ |  | T001 | T002 | T003 | T004 | T005 | T006 | T007 | T008 | T009 | T010 |
| √ | U001 | R | R | R | R | R |  | R | R | R | R |
| √ | U002 |  |  | R |  |  | R | R |  |  | R |
| √ | U003 | R |  | R | R |  |  | R | R | R | R |
| √ | U004 | R | R | R | R | R |  | R | R | R | R |
| √ | U005 |  |  | R |  |  |  | R | R | R |  |
| √ | U006 |  | R |  |  | R | R | R |  |  | R |
| √ | U007 |  |  | R |  |  |  | R | R | R |  |
| √ | U008 |  | R |  |  | R | R | R |  |  | R |
| √ | U009 |  |  | R |  |  | R | R |  |  | R |
| √ | U010 | R |  | R | R |  |  | R | R | R |  |

| | | M01 | | | | M02 | | M03 | M04 | M05 | M06 |
|---|---|---|---|---|---|---|---|---|---|---|---|
| | | T001 | T004 | T008 | T009 | T002 | T005 | T003 | T006 | T007 | T010 |
| G01 | | R+ | R+ | R | R | | | R | | R | |
| | U003 | R | R | R | R | | | R | | R | |
| | U005 | R+ | R+ | R | R | | | R | | R | |
| | U007 | R+ | R+ | R | R | | | R | | R | |
| | U010 | R | R | R | R | | | R | | R | |
| G02 | | R | R | R | R | R | R | R | | R | R |
| | U001 | R | R | R | R | R | R | R | | R | R |
| | U004 | R | R | R | R | R | R | R | | R | R |
| G03 | | | | | | R | R | | R | R | R |
| | U006 | | | | | R | R | | R | R | R |
| | U008 | | | | | R | R | | R | R | R |
| G04 | | | | | | | | R | R | R | R |
| | U002 | | | | | | | R | R | R | R |
| | U009 | | | | | | | R | R | R | R |

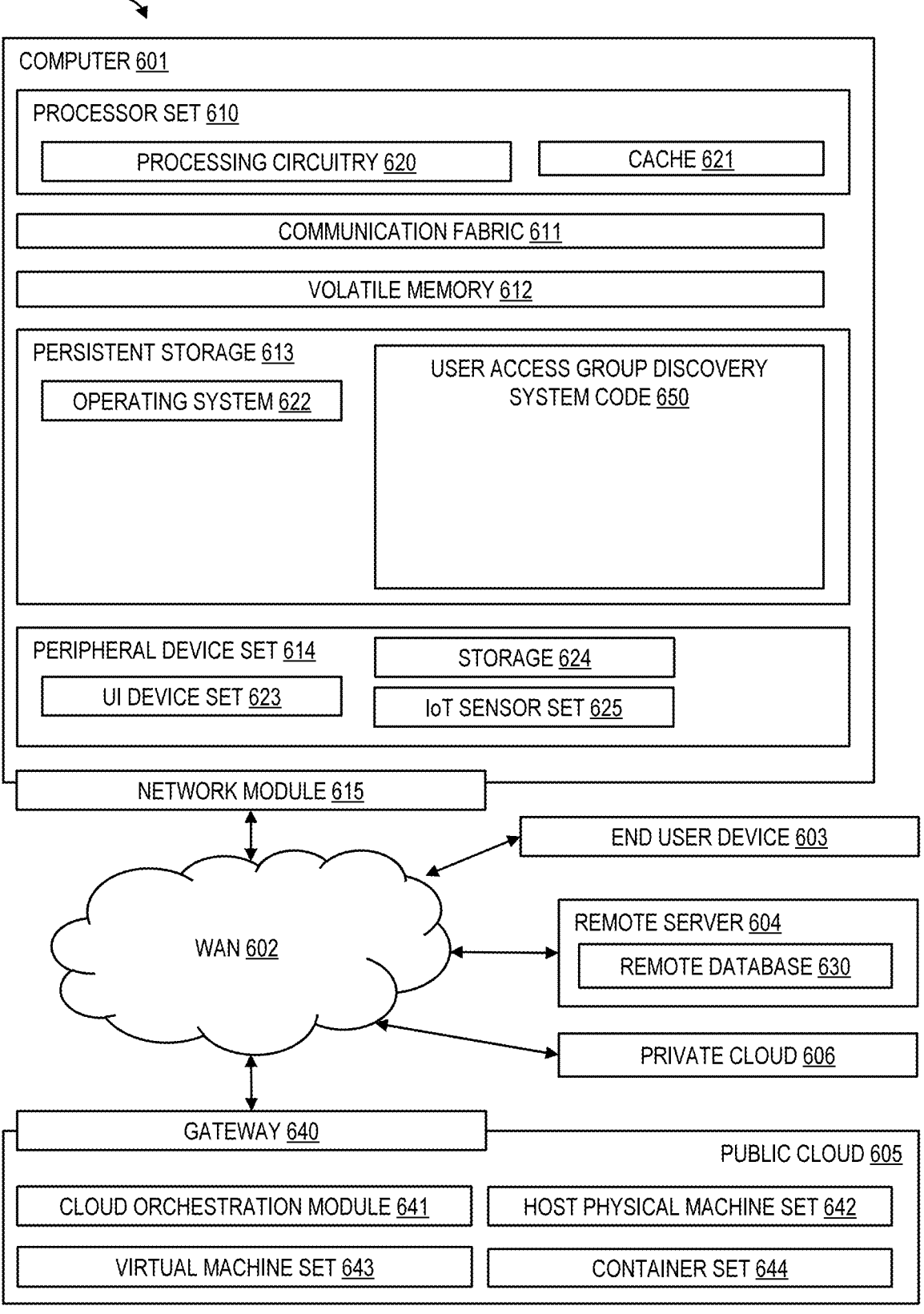

COMPUTER 601

PROCESSOR SET 610

PROCESSING CIRCUITRY 620          CACHE 621

COMMUNICATION FABRIC 611

VOLATILE MEMORY 612

PERSISTENT STORAGE 613

OPERATING SYSTEM 622

USER ACCESS GROUP DISCOVERY SYSTEM CODE 650

PERIPHERAL DEVICE SET 614          STORAGE 624

UI DEVICE SET 623          IoT SENSOR SET 625

NETWORK MODULE 615

WAN 602

END USER DEVICE 603

REMOTE SERVER 604

REMOTE DATABASE 630

PRIVATE CLOUD 606

GATEWAY 640

PUBLIC CLOUD 605

CLOUD ORCHESTRATION MODULE 641          HOST PHYSICAL MACHINE SET 642

VIRTUAL MACHINE SET 643          CONTAINER SET 644

*FIG. 6*

USER ACCESS GROUP DISCOVERY

BACKGROUND

The present invention relates to user access groups, and more specifically, to user access group discovery for security in production systems.

SUMMARY

According to an aspect of the present invention, there is provided a computer-implemented method for user access group discovery. The computer-implemented method includes generating a matrix that depicts the respective resources of a set of resources accessed by each of a plurality of users. The computer-implemented method further includes obtaining, for each user, a similarity measurement using the matrix. The similarity measurement is based on a comparison of the resources accessed by the user to the resources accessed by the other users. The computer-implemented method further includes generating, for each user, a feature vector for clustering the users into user access groups. The feature vector represents the resources accessed by the user. The computer-implemented method further includes applying the feature vectors and the similarity measurements to a centroid-based clustering algorithm to obtain the user access groups. The computer-implemented method further includes outputting the user access groups for application in a security environment. This aspect of the invention has the advantage of generating optimal access groups of users automatically based on existing users' access to a set of resources.

In an embodiment, the computer-implemented method includes sorting the plurality of users based on their similarity measurements, and selecting a set of users from the plurality of users to be initial cluster centroids, where the selected set of users have the most distant similarity measurements. This has the advantage of initiating the clusters with a set of distinct and distant users.

In an embodiment, the similarity measurement is further based on a cumulative comparison score of the user with the other users, and scored for a common access to a resource.

In an embodiment, the matrix represents defined access levels to the resources, and the similarity measurement is based on a comparison of the access levels between users. This has the advantage of allowing different forms of access levels to be incorporated into the similarity measurement.

In an embodiment, the similarity measurement uses a binary comparison of user access rights, where two users having a same access to a resource have a distance of 0, otherwise the distance is 1. Using a binary score provides a meaningful distance measurement.

In an embodiment, the centroid-based clustering algorithm forms clusters iteratively based on an evaluation of how good the clustering is at each iteration, where the evaluation is based on calculating the mean distance between centroids and group members. In an embodiment, the centroid-based clustering algorithm iterates through all of the users, and uses the similarity measurements to re-allocate users to groups. In an embodiment, the centroid-based clustering algorithm increases the number of groups iteratively until a threshold distance is reached. In an embodiment, the threshold distance is met when a mean distance between centroids of the groups and group members is less than a threshold percentage based on the number of users. Applying a threshold distance has the advantage of stopping the clustering algorithm at an optimal clustering.

In an embodiment, outputting a user access group includes indicating an inferred access to a resource by a user when the user is gaining access to the resource due to inclusion of the user in the user access group. This has the advantage of allowing an administrator to grant an access control that is identified as a possible access need for a user while not blocking existing users from accessing a resource.

In an embodiment, the computer-implemented method includes providing a user interface of the generated matrix, and outputting the user access groups in the user interface for manually refining the access in the user interface. The manual refinement may be carried out by an administrator and may include checking, merging, or separating groups.

In an embodiment, the matrix is generated based on data collected from a live production system over a period of time. This has the advantage of basing the discovered groups on real production requirements.

According to another aspect of the present invention, there is provided a computer system for user access group discovery. The computer system includes a processor set, a set of one or more computer readable storage media, and program instructions, collectively stored in the set of one or more storage media, for causing the processor set to perform the following computer operations: generate a matrix that depicts the respective resources of a set of resources accessed by each of a plurality of users; obtain, for each user, a similarity measurement using the matrix, where the similarity measurement is based on a comparison of the resources accessed by the user to the resources accessed by the other users; generate, for each user, a feature vector for clustering the users into user access groups, where the feature vector represents the resources accessed by the user; apply the feature vectors and the similarity measurements to a centroid-based clustering algorithm to obtain the user access groups; and output the user access groups for application in a security environment.

According to another aspect of the present invention, there is provided a computer-implemented method for resource access group discovery. The computer-implemented method includes generating a matrix that depicts the respective resources of a set of resources accessed by each of a plurality of users. The computer-implemented method further includes obtaining, for each resource of the set of resources, a similarity measurement using the matrix. The similarity measurement is based on a comparison of the resource's access by the users to other resources' access by the users. The computer-implemented method further includes generating, for each resource, a feature vector for clustering the resources into resource access groups. The feature vector represents the resource's access by the users. The computer-implemented method further includes applying the feature vectors and the similarity measurements to a centroid-based clustering algorithm to obtain the resource access groups. The computer-implemented method further includes outputting the resource access groups for application in a security environment. This aspect has the advantage of discovering resource groups as an alternative approach to discovering user groups, in which the discovered groups of resources have resources accessed by the same users.

According to another aspect of the present invention, there is provided a computer program product for user access group discovery, comprising: a set of one or more computer readable storage media, and program instructions, collectively stored in the set of one or more storage media, for causing a processor set to perform the following computer operations: generate a matrix that depicts the respective resources of a set of resources accessed by each of a plurality of users; obtain, for each user, a similarity measurement using the matrix, where the similarity measurement is based on a comparison of the resources accessed by the user to the resources accessed by the other users; generate, for each user, a feature vector for clustering the users into user access groups, where the feature vector represents the resources accessed by the user; apply the feature vectors and the similarity measurements to a centroid-based clustering algorithm to obtain the user access groups; and output the user access groups for application in a security environment. This aspect of the invention has the advantage of generating optimal access groups of users automatically based on existing users' access to a set of resources.

BRIEF DESCRIPTION OF THE DRAWINGS

Embodiments of the present invention will now be described, by way of example only, with reference to the accompanying drawings.

FIG. 1 is a schematic flow diagram of an example embodiment of a method in accordance with embodiments the present invention.

FIG. 2A is a flow diagram of an example embodiment of a method for discovering user groups of users with similar access levels to a set of resources in a secure environment in accordance with embodiments of the present invention.

FIG. 2B is a flow diagram of an example embodiment of a method for discovering resource groups with similar access levels by users in a secure environment in accordance with embodiments of the present invention.

FIG. 3A is a flow diagram of an example embodiment of a method of obtaining a similarity measurement in accordance with embodiments of the present invention.

FIG. 3B is a flow diagram of an example embodiment of a method of clustering to obtain groups in accordance with embodiments of the present invention.

FIG. 4A is a schematic diagram of an example embodiment of a user interface showing a generated user-resource matrix in accordance with embodiments of the present invention.

FIG. 4B is a schematic diagram of an example embodiment of a user interface showing a grouped user-resource matrix in accordance with embodiments of the present invention.

FIG. 6 is a block diagram of an example embodiment of a computing environment for the execution of at least some of the computer code involved in performing the present invention.

Figure 4C:
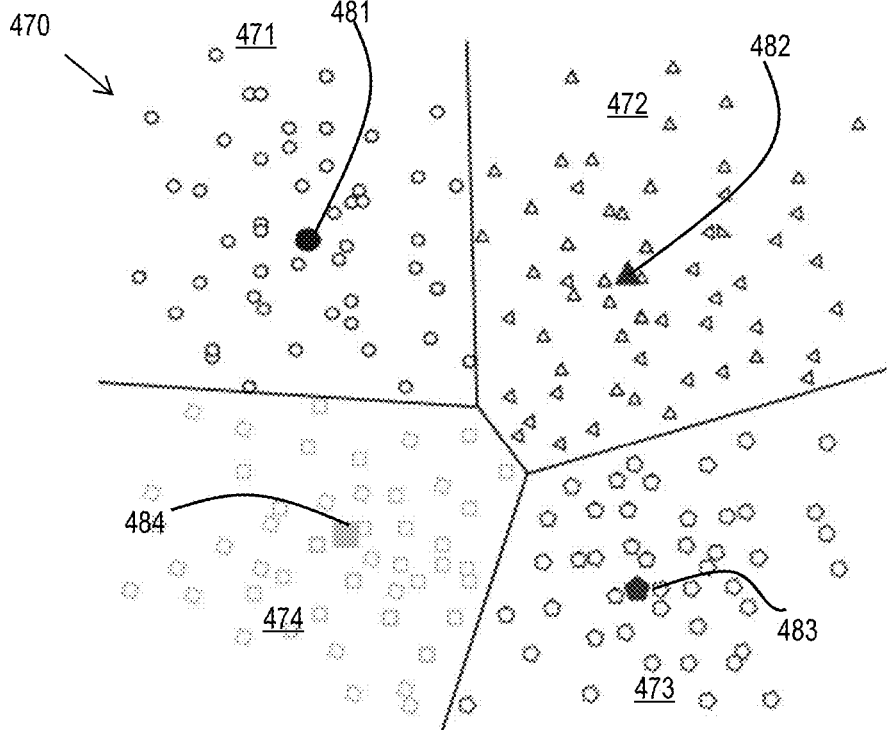
FIG. 4C is a schematic diagram of an example embodiment of clustered users in accordance with embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

The grouping of users by access permissions is generally in the technical field of computer security, and more particularly, in the technical field of controlling access to data.

Complex systems with thousands of users accessing thousands of resources require well defined access groups to maintain security. Authorizations to access resources are granted over time in a haphazard manner, often to individuals rather than groups, and often not revoked when no longer required. Multiple similar groups may be created over time, again in a haphazard manner.

In some situations, there are no roles defined, and a large number of users without defined roles requires a lot of detailed specification. This becomes difficult to handle and control. In other situations, a role model may have evolved without a strategy or clear end goal, and will require significant consistency verification and restructuring.

An existing solution for access management is manually defining user groups based on user roles and the resources they need to access. When users need access to resources that are not normally accessed by other users with the same role, access definitions get complicated. When users change roles, maintaining validity of access levels becomes harder.

One possible solution would be to create groups with a set of agreed permissions assigned to each group, and to move users to those groups; however, the size of the datasets involved is so huge that it is unmanageable. Clearly, defined roles are crucial for managing correct access rights for correct users for security purposes, but this cannot be achieved with existing processes that involve extensive manual interference.

Embodiments of a method, system, and computer program product are provided for user access group discovery. The method and system discover access groups for users to resources. The users may be defined users in the form of individual users or combinations of users having a unique user identifier. The resources may be defined resources that include a single resource or combinations of resources having a unique resource identifier. In an embodiment, the access groups are groups of defined users that are discovered to have access to the same resources. In an alternative embodiment, the access groups are groups of defined resources that are discovered to be accessed by the same users.

Representation of resource access rights of users on an access matrix facilitates use of a clustering algorithm. The representation of each user's resource access is provided as a feature vector to be used for the clustering algorithm to obtain groups of users with similar access requirements to resources. The feature vector for a user is a vector over the set of resources with access definitions for each resource. Alternatively, when trying to find resource groups, a feature vector for a resource may be used for grouping of resources. The feature vector for a resource is a vector over the set of users with access definitions for each user.

Referring to FIG. 1, a block diagram 100 shows an overview of the described method. System access definitions 101 and discovered runtime accesses 102 are represented as a user-resource access matrix 103. The matrix is generated to show each user's access to a set of resources based on collected access data of a system. In an embodiment, the user-resource access matrix 103 represents each user's resource access, and may be used for each user as a feature vector for clustering of users into access groups. In an embodiment, the user-resource access vector may alternatively be used for each resource as a feature vector for clustering of resources into access groups. The user-resource access matrix 103 may be provided as a user interface to display users, resources, and access groups, once they are allocated by the method.

A similarity analysis 104 is carried out on the user-resource access matrix 103 to cluster users or resources into groups 105. In an embodiment, the method groups the users into user access groups of users with access to the same set of resources. In alternative embodiment, the matrix is used to group the resources into resource access groups of resources that are accessible by a same set of users. This may use a centroid-based clustering algorithm to obtain access groups in which the users or resources are clustered.

The similarity analysis 104 may use a similarity measurement (also referred to herein as a "distance measurement") 106 between users or resources. In an embodiment, the similarity measurement is obtained for each user based on a comparison of the user's access to the set of resources to other users' access to the set of resources. In an alternative embodiment, the similarity measurement is obtained for each resource based on a comparison of the resource's access by the set of users to other resources' access by the set of users.

The similarity analysis 104 may use a centroid-based clustering algorithm using the feature vectors from the matrix. The similarity analysis 104 may use a group initialization 107. The initial groups may be selected by sorting the users or resources based on their similarity measurement and selecting a set of users or resources as initial cluster centroids from the users with the most distant similarity measurements (i.e., the least similar users).

The similarity analysis 104 may use a group stopping threshold 108. The group stopping threshold 108 may stop the clustering algorithm when a mean distance between centroids of the groups and group members is less than a threshold percentage based on the number of users or the number of resources.

The method may output 105 the access groups of users for application to a security environment. The groups may be output by display in the user-resource access matrix 103 where the groups may be further refined.

Referring to FIG. 2A, a flow diagram 200 shows an example embodiment of the described method of discovering user groups of users with similar access levels to a set of resources in a secure environment. In an embodiment, the method may be applied in a production system. A production system is a system that is used in a live environment as opposed to a development environment. Determining user access in a production environment is valuable as it provides a real indication of users' requirements.

The method may collect 201 access definitions and access data of users' access to a set of resources in a production system over a set period of time. For example, the set time period may be at least a month. The access definitions are definitions of what access level to a resource or group of resources is granted to a user or group of users. The access data includes information about which users have actually accessed the resource, and what level of access they used.

The access data may record that a user accessed a resource where there is currently no access control set, so the user will not have any access defined (e.g., for a public document). This latter category is particularly interesting because someone (such as the owner of the resource) may want to add access controls to the resource, but may not want to block existing users accessing the resource because that could stop them doing their job.

Using the method described below, collected access data and existing access definitions are used to automatically create user groups. Complex systems with thousands of users accessing thousands of resources requires well defined access groups to maintain security. This helps with achieving zero-trust guidelines.

The method may generate 202 an access matrix of collected access data with the matrix showing user access to resources. The access matrix may be generated 202 for users accessing resources based on system security definitions. Representation of resource access rights on an access matrix may be displayed on a user interface. The access matrix displays the intersection between permissions of users (identified by user identifiers) and resources (identified by resource identifiers). In one example of the access matrix, each row represents user access to resources and a row index represents a resource.

Representation of resource access rights on an access matrix facilitates use of a clustering algorithm. Representation of each user's resource access is provided as a feature vector to be used for the clustering algorithm. The feature vector for a user is a vector over the set of resources with access definitions for each resource.

The method may obtain 203 a similarity measurement between users based on a comparison of users' access rights. In an embodiment, the similarity measurement may be based on a binary comparison of user access rights. For example, when two users have the same access to a resource a distance is 0, otherwise the distance is 1. In an alternative embodiment, the similarity measurement may be, instead of using binary comparison, defining distance values between access rights (READ, UPDATE, CONTROL, ALTER). For example, a READ-UPDATE distance may be 1, and a READ-ALTER distance may be 3.

In an embodiment, the similarity measurement may be obtained for similarity between two users over all the resources. This may involve calculating a cumulative distance for two users over all the resources, and then applying the square root of the cumulative distance for a Euclidean distance measurement. Euclidian distance is used to obtain less skewed distances and is proven to be more useful when comparing multidimensional feature vectors.

The method may use 204 a centroid initialization technique to set the initial groups in the clustering algorithm. In an embodiment, the method may use a centroid initialization technique that sorts the users from the user that is furthest to all others to users that are closer to other users, and may set the initial centroids as a defined number of the most distant users. An alternative initialization technique may be to randomly choose users as group centroids.

The method may identify 205 groups based on similarity, using a centroid-based clustering algorithm using the feature vectors of users from the matrix and the obtained similarity measurement. The approach uses an unsupervised machine learning technique. In an embodiment, the feature vectors and the similarity measurements are applied to the centroid-based clustering algorithm to obtain the user access groups. The clusters are formed iteratively based on an evaluation of how good the clustering is at every iteration, for example, by calculating the mean distance between centroids and group members.

Centroid-based clustering organizes the data into groups of data points based on the proximity of data points to the cluster centroid (i.e. the cluster center). The proximity between data points to the centroid uses a similarity measurement.

The k-means algorithm is the most widely used centroid-based clustering algorithm; however, other forms of centroid-based clustering algorithms may be used. The k-means clustering algorithm is a method of vector quantization that aims to partition n users into k groups, in which each user belongs to the cluster with the nearest mean (cluster centroid). The k-means clustering minimizes within-cluster variances (squared Euclidean distances).

The method may stop 206 the clustering algorithm when a threshold distance is reached within the groups. The group stopping threshold may stop the clustering algorithm when a mean distance between centroids of the groups and group members is less than a threshold percentage. This ensures groups have similar user access. Alternatively, the method may stop when a defined limited number of groups have been generated.

The threshold distance may be adjustably defined 207 based on a number of users. The threshold may be adjustable as a percentage (for example, 10%) of the total number of users, where 0% means users with the same access rights are put in the same group.

Referring to FIG. 2B, a flow diagram 210 shows an example embodiment of the described method for discovering resource groups with similar access levels by users in a secure environment. The method may be equivalent to the method described in FIG. 2A with the users and resources reversed.

The method may collect 211 access definitions and access data of users' access to a set of resources in a production system over a set period of time. The method may generate 212 an access matrix of collected access data with the matrix showing user access to resources. The access matrix may be generated 202 for users accessing resources based on system security definitions. Representation of resource access rights on an access matrix may be displayed on a user interface.

The representation of each resource's access by the set of users is provided as a feature vector to be used for the clustering algorithm. The feature vector for a resource is a vector over the set of users with access definitions for each user.

The method may obtain 213 a similarity measurement between resources based on a comparison of users' access to resources. In an embodiment, the similarity measurement may be based on a binary comparison of resource access rights. For example, when two resources are both accessible by a user a distance is 0, otherwise the distance is 1. In an alternative embodiment, the similarity measurement may be, instead of using binary comparison, defining distance values between access rights (READ, UPDATE, CONTROL, ALTER). For example, a READ-UPDATE distance may be 1, and a READ-ALTER distance may be 3.

In an embodiment, the similarity measurement may be obtained for similarity between two resources over all the users. This may involve calculating a cumulative distance for two resources over all the users, and then applying the square root of the cumulative distance for a Euclidean distance measurement.

The method may use 214 a centroid initialization technique to set the initial groups in the clustering algorithm. In an embodiment, the method may use a centroid initialization technique that sorts the resources from the resource that is furthest to all others to resources that are closer to other resources, and may set the initial centroids as a defined number of the most distant resources. An alternative initialization technique may be to randomly choose resources as group centroids.

The method may identify 215 groups based on similarity, using a centroid-based clustering algorithm using the feature vectors of resources from the matrix and the obtained similarity measurement. In an embodiment, the feature vectors and the similarity measurements are applied to the centroid-based clustering algorithm to obtain the user access groups.

The method may stop 216 the clustering algorithm when a threshold distance is reached within the groups. In an embodiment, the group stopping threshold may stop the clustering algorithm when a mean distance between centroids of the groups and group members is less than a threshold percentage. This ensures groups have similar accesses to the resources. In an alternative embodiment, the method may stop when a defined limited number of groups have been generated.

The threshold distance may be adjustably defined 217 based on a number of resources. The threshold may be adjustable as a percentage (for example, 10%) of the total number of resources, where 0% means resources with the same access rights are put in the same group.

The remainder of the description is described in terms of obtaining groups of users with similar access levels as previously described above with respect to FIG. 2A. However, equivalent methods and systems may be provided for obtaining resource groups with similar access levels by users as previously described above with respect to FIG. 2B.

Referring to FIG. 3A, a flow diagram 300 shows a more detailed example embodiment of the described method of obtaining a similarity measurement between users.

The method may collect 301 user access data to resources with access definitions in a production system. The data may then be filtered 302 to only show existence of the access.

The collection step 301 may use the methods as described in U.S. Pat. No. 11,663,324B, the contents of which is incorporated herein by reference. U.S. Pat. No. 11,663,324B describes a computer-implemented method of acquiring information for identifying a security configuration for an application. The described method includes: executing an application in a development environment; detecting security requests made on behalf of the application; and storing security request information describing the detected security requests in a security log. The development environment is configured to execute the application with fewer security provisions compared to an operating environment for routine execution of applications. By detecting security requests while the application is executed in an environment with minimal security provisions, a full understanding of the security requirements of the application may be obtained. Security requests made on behalf of the application are detected. An application server on which the application is run may be configured to capture all security requests made on behalf of the application. In some embodiments, hooks may be inserted into code of the application corresponding to the security requests, such that the security requests may be detected. The security requests may be detected prior to them being passed to a security component. Security request information describing the detected security requests is stored in a security log. In some embodiments, the security request information comprises a security request identifier, and one or more of a time stamp, a server identifier, an entry point identifier, and a user identifier. In the case that the security log contains a security request identifier, a security configuration that is more accurate may be obtained, as each security request may be identified. Indeed, additional information, such as a time stamp, server ID, entry point ID and user ID may be useful for producing an appropriate security configuration. By way of example, it may be determined that users require more or less authentication, or that a certain access point requires additional security provisions.

The described method of obtaining a similarity measurement may then generate 303 an access matrix data structure that shows users' access to resources, where users are the rows, resources are the columns, and cells are actual access levels.

In a simple case, there may be four levels of access-READ, UPDATE, CONTROL, ALTER, where each level includes the one below (for example, if the level is UPDATE, this implicitly includes READ as well).

For every user, the method may calculate 304 a distance score to all other users. In some embodiments, this may use a binary comparison. When two users have a same access level to a resource a distance is 0, otherwise the distance is 1. In other embodiments, alternative values of distance measures may be used. For example, READ-UPDATE=1, READ-CONTROL=2, READ-ALTER=3.

This distance score is calculated between two access rows of the matrix for a user and another user. This is repeated between the user and all other users, and the cumulative distance obtained. Therefore, a higher distance will be obtained for users that have the lowest number of same accesses as the other users. A square root is applied 305 to the cumulative distance to provide a Euclidian distance with a less skewed distance for multidimensional feature vectors.

The method may sort 306 users in descending order by their distance measurement to all other users. In other words, the sorted order starts with the furthest user from all other users and ends with the closest user to all other users.

The method may set 307 an initial number of groups N. The initial number of groups may be provided or set to N=2, if not provided. The method may take 308 the top "N" access rows from the sorted list as the starting centroids (cluster centers). These will be the N furthest users from other users.

Referring to FIG. 3B, a flow diagram 310 shows an example embodiment of a method of clustering to obtain groups.

The method may apply 311 a k-means clustering algorithm to find the optimum groups. The k-means clustering algorithm is a method of vector quantization that aims to partition the users into groups, in which each user belongs to the cluster with the nearest mean (cluster centroid). The k-means clustering minimizes within-cluster variances (squared Euclidean distances).

The method may increase 312 the number of groups iteratively until the threshold distance is reached. The method may iterate 313 through all users and use the similarity measurement to re-allocate users to groups.

The k-means algorithm works by determining a set of "k" centroids (groups), and assigning users to the closest group. In the follow-up iterations, the centroids are recalculated by taking the average of all the users assigned to the group first, and then, again, re-calculating the distance of each of the users to the new centroids. Once the users are redistributed, the mean distance for each group is calculated by calculating the distance of each user to its group centroid and averaging over all the users of the group. The maximum of all these mean distances is compared to the threshold. If it is less than the threshold, the algorithm stops; otherwise, the next iteration starts from the follow-up iterations.

For each row, the method may find the closest row. If it is a centroid, the return value would be the centroid itself. The method may add the row to the clusters map using "centroid" as the key.

The method may check if there is a change to the last state of the clusters, and if no change is detected, then an optimum clustering has been achieved. The method may check if there are centroids that represent the group better, for example, the row that has total distance to all cluster members is smaller.

The method may stop 314 the clustering when the mean distance of all group members to the centroid is less than the maximum threshold distance percentage. The threshold may be adjusted 315 for different users and resources based on number of users, e.g., 10% of the number of users.

In an embodiment, the method may enable the manual 316 refinement of the identified groups by finding overlaps and identifying new groups close to the existing ones. The method may provide 317 the user interface to merge these groups.

Groups are created for each centroid and the users close to that centroid are assigned to that group (role). In the initial matrix, each user is annotated with their group identifier (an enumerated name generated for each group). Some users will now have "inferred access" by becoming a part of the group where the user did not have access initially, but gains access because they are put in a group. This may be indicated in the access matrix using a symbol, such as the + sign.

The method and system may be applied to help system administrators and application owners to improve their security configurations with a view to adopting a zero trust strategy. The same approach may apply to other systems where there is a significant number of user identities that need access to various resources and it is desirable to control access through a role-based access control, and where the roles and groupings of resources have not yet been well organized.

The method and system may therefore be applied to transaction servers, other multi-user computer systems, some cloud-based environments, orchestration systems, and other suitable environments.

Referring to FIG. 4A, a schematic diagram 400 shows an example embodiment of a user-resource access matrix 410 for users accessing resources based on system security definitions.

The matrix 410 shows a list of users (U001 to U010), with each user having a row in the matrix 410 showing access to particular resources (T001 to T010) provided in columns. An access is shown as "R". The checks (√) shown in the matrix 410 indicate that the users and resources are ungrouped 430 at this stage.

A user row 420 may be used as a representation of user resource access as a feature vector to be used for a clustering algorithm to generate user groups.

A resource column 440 may be used as a representation of resources accessed by users as a feature vector to be used for a clustering algorithm to generate resource groups.

Referring to FIG. 4B, a schematic diagram 450 shows an example embodiment of a grouped user-resource access matrix 460. In this embodiment, users have been grouped into groups (G01 to G04). Groups that include some users that have inferred access are shown with the resource indicated as R+. The users within the group having inferred access are also shown with R+ where the user did not have access initially, but is gaining access because they are put in a group. For example, in group G01, resources T001 and T004 are indicated as R+ as users U005 and U007 have inferred access.

Once users are grouped, some resources are also grouped together (e.g., in M01 and M02) to define resource groups to simplify access management in the follow-up steps, which include verification of groupings by a system administrator.

Referring to FIG. 4C, a schematic diagram 470 shows clusters 471, 472, 473, 474 in an example centroid-based clustering. Each cluster has a cluster center or centroid 481, 482, 483, 484.

A user access graph may be used to show which user has access to which resource using an annotated link between user and the resource. The annotations will be the access level.

The following code provides an example embodiment of a method of similarity measurement based on binary comparison of user access rights:

```
*distance between two rows
*/
public double distance (AccessRow other) {
    int total=0;
    inti=0;
    for (Access access: accessRow) {
        if (!nullSafeEquals (access, other.get(i)))
            total++
        i++;
    }
    return Math.sqrt(total);
```

The following code provides an example embodiment of a method of using the initialization technique to get the initial groups:

```
private        static        Map<Integer,
    List<AccessRow>>findDistanceGroups
    {List<AccessRow> rows) {
    Map<Integer, List<AccessRow>>counts=new Hash-
        Map< >( );
    for (AccessRow refRow:rows) {//calculate total dis-
        tances of every row to//others
        double dist=0;
        for (AccessRow row:rows) {
            dist+=row.distance (refRow);
        }
        List<AccessRow>countList=counts.get((int) dist);//list
        of access rows//with same distance
        if (countList==null)
            countList=new Array List<AccessRow>( );
        countList.add(refRow);
        counts.put((int) dist, countList);
    }
    return counts;
}
```

The following code provides an example embodiment of a method of k-means clustering:

```
/*
*Fit a fixed number of clusters
*/
private static Map<AccessRow, List<AccessRow>>fit
    (List<AccessRow>rows, int k,
int            maxIterations,            Map<Integer,
    List<AccessRow>>distanceGroups) {
    List<AccessRow>centroids=randomCentroids    (dis-
        tanceGroups, k);
    Map<AccessRow,    List<AccessRow>>clusters=new
        HashMap< >( );
    Map<AccessRow,    List<AccessRow>>lastState=new
        HashMap< >( );
    inti=0;
    while (i<maxIternations) {
        for (AccessRow row; rows) {//for each row
            AccessRow  centroid=nearestCentroid(row, cen-
                troids);
                //find the closest row; if it is a centroid the
                return value would
```

```
                //be the centroid itself
            assignToCluster(clusters, row, centroid);
                //add the row to the clusters map using "cen-
                troid" as the key
        }
        if (!isClusterChanged(clusters, lastState))
            break;//no change means optimum clustering
                achieved
        lastState=clusters;
        centroids=relocateCentroids(clusters, centroids);
            //check if there are centroids that represent the
                group better, e.g. the
            //cluster that has total distance to all cluster mem-
                bers is smaller
        clusters=new HashMap< >( );
        i++;
    }
    return lastState;
}
```

The following code provides an example embodiment of a method of providing a maximum distance threshold:

```
for (int i=klow; i<=khigh; i++ {
    clusters=Similarity.fit (rows, i, maxIterations, distance-
        Groups);
    double meanDistance=0.0;
    for (AccessRow key; clusters.keySet( )) {
        List<AccessRow>cluster=clusters.get(key);
        for (AccessRow AccessRow; cluster) {
            meanDistance+=key.distance (AccessRow);
        }
    {
    meanDistance/=i;
    if (meanDistance<minMeanDistance) {
        optimumClusters=clusters;
        minMeanDistance=meanDistance;
    }
    if        (meanDistance<=Math.sqrt(rows.get(i).size(
        )*0.01*maxDistancePercentage)) break;
}
```

Figure 5:
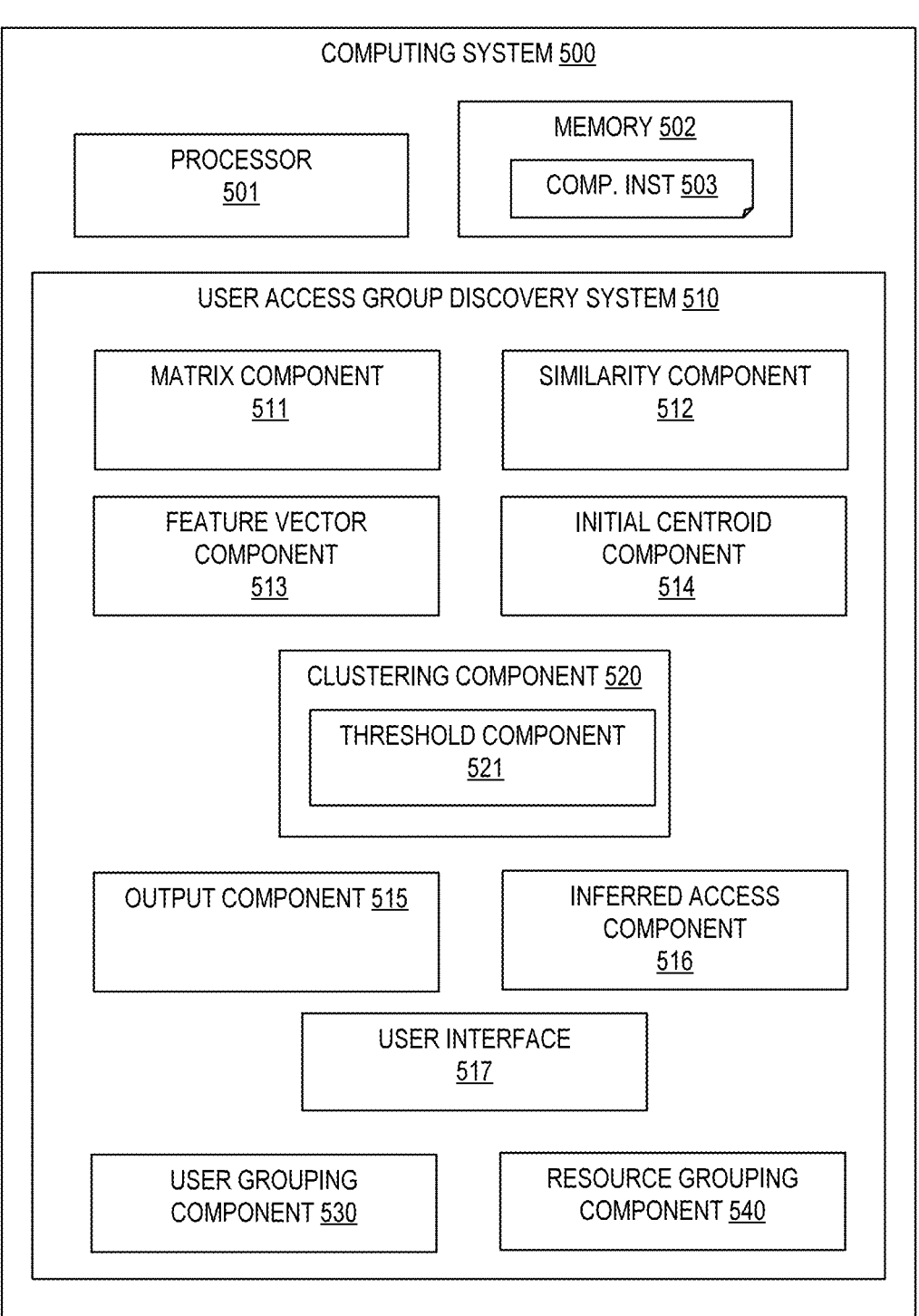
FIG. 5 is a block diagram of an example embodiment of a system in accordance with embodiments of the present invention.

Referring to FIG. 5, a block diagram shows a computing system 500 in which the described user access discovery system 510 may be implemented. The computing system 500 may include at least one processor 501, a hardware module, or a circuit for executing the functions of the described components which may be software units executing on the at least one processor. Multiple processors running parallel processing threads may be provided enabling parallel processing of some or all of the functions of the components. Memory 502 may be configured to provide computer instructions 503 to the at least one processor 501 to carry out the functionality of the components.

The user access discovery system 510 may include a matrix component 511 for generating a matrix of users' access to a set of resources. The matrix component 511 may generate a matrix that represents defined access levels to the resources, and the similarity measurement is based on a comparison of the access levels between users.

The user access discovery system 510 may include a similarity component 512 for obtaining a similarity measurement. In an embodiment in which groups of users are discovered using similar resources, the similarity measurement is obtained for each user using the matrix, and is based on a comparison of the user's access to the set of resources with other users' access to the set of resources. The similarity component 512 may be used for obtaining a similarity measurement based on a cumulative comparison score of a user with all other users, and scored for a common access to a resource.

In an embodiment in which groups of resources accessed by the same users are discovered, the similarity measurement is obtained for each resource using the matrix, and is based on a comparison of resource's access by the set of users to other resources' access by the set of users. The similarity component 512 may be for obtaining a similarity measurement based on a cumulative comparison score of a user with all other users, and scored for a common access to a resource.

The similarity component 512 may use a binary comparison of user access rights, where two users having a same access to a resource have a distance of 0, otherwise the distance is 1.

The user access discovery system 510 may include a feature vector component 513 for representing either a user's access to resources as a feature vector for clustering of users into access groups or for representing a resource's access by users as a feature vector for clustering of resources into access groups.

The user access discovery system 510 may include an initial centroid component 514 for sorting the users or resources by their similarity measurement, and selecting a set of users as initial cluster centroids. In an embodiment, this may include selecting a set of the users with the most distant similarity measurements. In an alternative embodiment, this may include selecting a set of the resources as initial cluster centroids from the resources with the most distant similarity measurements.

The user access discovery system 510 may include a clustering component 520 for applying a centroid-based clustering algorithm to obtain the access groups based on the similarity measurement. The clustering component 520 may form clusters iteratively based on an evaluation of how good the clustering is at every iteration, by calculating the mean distance between centroids and group members.

The clustering component 520 may include a threshold component 521 where the clustering component 520 may increase the number of groups iteratively until a threshold distance is reached, iterate through all users/resources, and use the similarity measurement to re-allocate users to groups. The threshold component 521 may determine that a threshold distance is met when a mean distance between centroids of the groups and group members is less than a threshold percentage based on the number of users/resources.

The user access discovery system 510 may include an inferred access component 516 for indicating an inferred access to a resource by a user when outputting an access group where a user is gaining access to a resource due to inclusion in a group.

The user access discovery system 510 may include an output component 515 for outputting the access groups of users or groups of resources for application in a security environment. A user interface 517 may be provided for providing interaction by an administrator user with the generated matrix and with the output access groups for manually refining the access in the user interface.

The user access discovery system 510 may include a user grouping component 530 for using the above components for discovering user groups. The user access discovery system 510 may include a resource grouping component 540 for using the above components for discovering resource groups.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 6, computing environment 600 contains an example of an environment for the execution of at least some of the computer code involved in performing the inventive methods, such as user access group discovery system code 650. In addition to block 650, computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and block 650, as identified above), peripheral device set 614 (including user interface (UI) device set 623, storage 624, and Internet of Things (IoT) sensor set 625), and network module 615. Remote server 604 includes remote database 630. Public cloud 605 includes gateway 640, cloud orchestration module 641, host physical machine set 642, virtual machine set 643, and container set 644.

COMPUTER 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 601, to keep the presentation as simple as possible. Computer 601 may be located in a cloud, even though it is not shown in a cloud in FIG. 6. On the other hand, computer 601 is not required to be in a cloud except to any extent as may be affirmatively indicated.

PROCESSOR SET 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 621 and the other storage media discussed below. The program instructions, and associated data, are accessed by processor set 610 to control and direct performance of the inventive methods. In computing environment 600, at least some of the instructions for performing the inventive methods may be stored in block 650 in persistent storage 613.

COMMUNICATION FABRIC 611 is the signal conduction path that allows the various components of computer 601 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 612 is any type of volatile memory now known or to be developed in the future. Examples include dynamic type random access memory (RAM) or static type RAM. Typically, volatile memory 612 is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

PERSISTENT STORAGE 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid state storage devices. Operating system 622 may take several forms, such as various known proprietary operating systems or open source Portable Operating System Interface-type operating systems that employ a kernel. The code included in block 650 typically includes at least some of the computer code involved in performing the inventive methods.

PERIPHERAL DEVICE SET 614 includes the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers. IoT sensor set 625 is made up of sensors that can be used in Internet of Things applications. For example, one sensor may be a thermometer and another sensor may be a motion detector.

NETWORK MODULE 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer readable program instructions for performing the inventive methods can typically be downloaded to computer 601 from an external computer or external storage device through a network adapter card or network interface included in network module 615.

WAN 602 is any wide area network (for example, the internet) capable of communicating computer data over non-local distances by any technology for communicating computer data, now known or to be developed in the future. In some embodiments, the WAN 602 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 603 is any computer system that is used and controlled by an end user (for example, a customer of an enterprise that operates computer 601), and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on.

REMOTE SERVER 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604.

PUBLIC CLOUD 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments.

Gateway 640 is the collection of computer software, hardware, and firmware that allows public cloud 605 to communicate through WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Improvements and modifications can be made to the foregoing without departing from the scope of the present invention.

What is claimed is:

1. A computer-implemented method for user access group discovery, comprising:
   generating a matrix that depicts the respective resources of a set of resources accessed by each of a plurality of users;
   obtaining, for each user, a similarity measurement using the matrix, wherein the similarity measurement is based on a comparison of the resources accessed by the user to the resources accessed by the other users;
   generating, for each user, a feature vector for clustering the users into user access groups, wherein the feature vector represents the respective resources of the set of resources accessed by the user and a corresponding access definition for each resource accessed by the user;

applying the feature vectors and the similarity measurements to a centroid-based clustering algorithm to obtain the user access groups; and outputting the user access groups for application in a security environment.

2. The computer-implemented method of claim 1, further comprising:

sorting the plurality of users based on their similarity measurements; and selecting a set of users from the plurality of users to be initial cluster centroids, wherein the selected set of users have the most distant similarity measurements.

3. The computer-implemented method of claim 1, wherein the similarity measurement is further based on a cumulative comparison score of the user with the other users, and scored for a common access to a resource.

4. The computer-implemented method of claim 3, wherein the matrix represents defined access levels to the resources, and the similarity measurement is based on a comparison of the access levels between users.

5. The computer-implemented method of claim 4, wherein the similarity measurement uses a binary comparison of user access rights, where two users having a same access to a resource have a distance of 0, otherwise the distance is 1.

6. The computer-implemented method of claim 1, wherein the centroid-based clustering algorithm forms clusters iteratively based on an evaluation of how good the clustering is at each iteration, and wherein the evaluation is based on calculating the mean distance between centroids and group members.

7. The computer-implemented method of claim 1, wherein the centroid-based clustering algorithm iterates through all of the users, and uses the similarity measurements to re-allocate users to [user access] groups.

8. The computer-implemented method of claim 7, wherein the centroid-based clustering algorithm increases the number of groups iteratively until a threshold distance is reached.

9. The computer-implemented method of claim 8, wherein the threshold distance is met when a mean distance between centroids of the groups and group members is less than a threshold percentage based on the number of users.

10. The computer-implemented method of claim 1, wherein outputting a user access group includes indicating an inferred access to a resource by a user when the user is gaining access to the resource due to inclusion of the user in the user access group.

11. The computer-implemented method of claim 1, further comprising:

providing a user interface of the generated matrix; and outputting the user access groups in the user interface for manually refining the access in the user interface.

12. The computer-implemented method of claim 1, wherein generating the matrix is based on data collected from a live production system over a period of time.

13. A computer-implemented method for user access group discovery, comprising:

generating a matrix that depicts the respective resources of a set of resources accessed by each of a plurality of users;

obtaining, for each user, a similarity measurement using the matrix, wherein the similarity measurement is based on a comparison of the resources accessed by the user to the resources accessed by the other users;

generating, for each user, a feature vector for clustering the users into user access groups, wherein the feature vector represents the respective resources of the set of resources accessed by the user;

applying the feature vectors and the similarity measurements to a centroid-based clustering algorithm to obtain the user access groups, wherein the centroid-based clustering algorithm forms clusters of the user access groups iteratively based on an evaluation of how good the clustering is at each iteration, and wherein the evaluation is based on calculating a mean distance between centroids of the user access groups and user access group members; and outputting the user access groups for application in a security environment.

14. The computer-implemented method of claim 13, further comprising:

sorting the plurality of users based on their similarity measurements; and selecting a set of users from the plurality of users to be initial cluster centroids, wherein the selected set of users have the most distant similarity measurements.

15. The computer-implemented method of claim 13, wherein the similarity measurement is further based on a cumulative comparison score of the user with the other users, and scored for a common access to a resource.

16. The computer-implemented method of claim 13, wherein the matrix represents defined access levels to the resources, and the similarity measurement is based on a comparison of the access levels between users.

17. The computer-implemented method as claimed in claim 16, wherein the similarity measurement uses a binary comparison of user access rights, where two users having a same access to a resource have a distance of 0, otherwise the distance is 1.

18. The computer-implemented method of claim 13, wherein the centroid-based clustering algorithm iterates through all of the users, and uses the similarity measurements to re-allocate users to groups.

19. The computer-implemented method of claim 18, wherein:

the centroid-based clustering algorithm increases the number of groups iteratively until a threshold distance is reached; and the threshold distance is met when a mean distance between centroids of the groups and group members is less than a threshold percentage based on the number of users.

20. The computer-implemented method of claim 13, wherein outputting a user access group includes indicating an inferred access to a resource by a user when the user is gaining access to the resource due to inclusion of the user in the user access group.

21. The computer-implemented method of claim 13, wherein the program instructions further cause the processor set to perform the following computer operations:

provide a user interface of the generated matrix; and output the user access groups in the user interface for manually refining the access in the user interface.

22. A computer-implemented method for user access group discovery, comprising:

generating a matrix that depicts the respective resources of a set of resources accessed by each of a plurality of users;

obtaining, for each user, a similarity measurement using the matrix, wherein the similarity measurement is based on a comparison of the resources accessed by the user to the resources accessed by the other users;

generating, for each user, a feature vector for clustering the users into user access groups, wherein the feature vector represents the respective resources of the set of resources accessed by the user;

applying the feature vectors and the similarity measurements to a centroid-based clustering algorithm to obtain the user access groups, wherein the centroid-based clustering algorithm iterates through all of the users and uses the similarity measurements to re-allocate users to the user access groups; and outputting the user access groups for application in a security environment.

23. The computer-implemented method of claim 22, further comprising:

sorting the plurality of resources based on their similarity measurements; and selecting a set of resources from the plurality of resources to be initial cluster centroids, wherein the selected set of resources have the most distant similarity measurements.

24. A computer-implemented method for user access group discovery, comprising:

generating a matrix that depicts the respective resources of a set of resources accessed by each of a plurality of users;

obtaining, for each user, a similarity measurement using the matrix, wherein the similarity measurement is based on a comparison of the resources accessed by the user to the resources accessed by the other users;

generating, for each user, a feature vector for clustering the users into user access groups, wherein the feature vector represents the respective resources of the set of resources accessed by the user;

applying the feature vectors and the similarity measurements to a centroid-based clustering algorithm to obtain the user access groups, wherein the centroid-based clustering algorithm increases the number of user access groups iteratively until a mean distance between centroids of the user access groups and user access group members is less than a threshold percentage; and outputting the user access groups for application in a security environment.

* * * * *